Aug. 13, 1963   W. M. WAKELEY   3,100,831
MAGNETIC FORCE WELDER
Filed March 22, 1961   3 Sheets-Sheet 2

INVENTOR.
William M. Wakeley
BY John W. Michael
Attorney

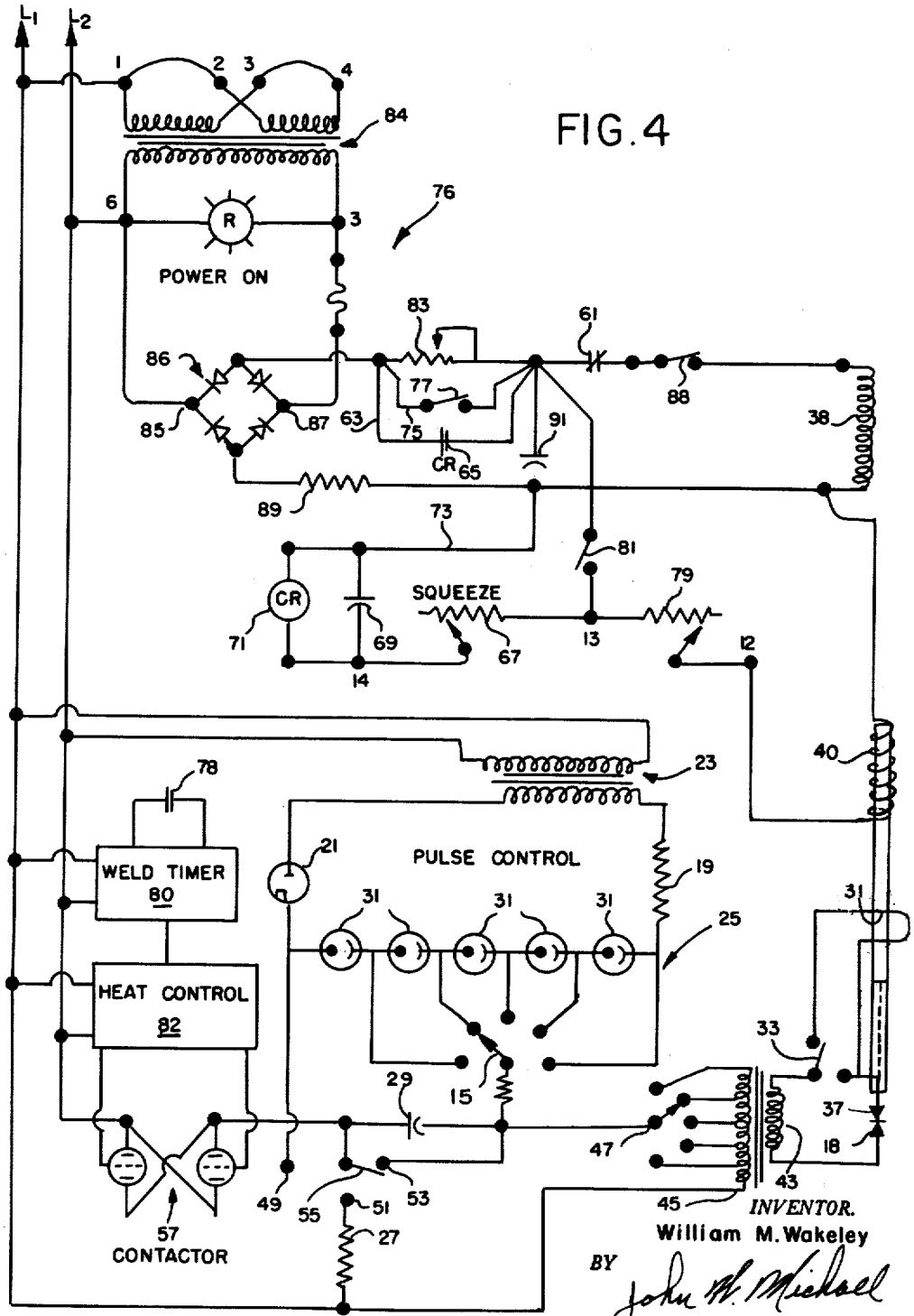

3,100,831
MAGNETIC FORCE WELDER
William M. Wakeley, Milwaukee, Wis., assignor to Acro Welder Mfg. Co., Milwaukee, Wis., a corporation of Wisconsin
Filed Mar. 22, 1961, Ser. No. 97,582
28 Claims. (Cl. 219—86)

This invention relates to welding machines and particularly, to the control of the welding force and current.

The increasing use of complex metals in the fabrication of modern appliances has presented a number of problems to the welding industry. One of these problems is the requirement for a machine which can provide a variety of combinations of pressure and current. This problem is further increased by the different sizes and shapes of the metals being welded. The development of magnetic force welders has resulted in better control in the application of force and welding current, but this development has been limited somewhat to the larger welding operations.

The primary object of the present invention is to provide a welding machine which can be adapted to weld a large variety of metals of various sizes and shapes.

Another object of the present invention is to provide a very accurate control for the force applied to the workpiece in a magnetic force welder.

Still another object of the present invention is to reduce friction to a minimum in a magnetic force welder.

A further object is to provide a magnetic force welder with a selectively operable supplementary force device which is responsive to the application of electrode current.

Still another object of the present invention is to provide a welding machine in which all of the movements and forces applied to the workpiece are magnetically controlled.

A still further object is to provide a magnetic force welder having a relatively short electrode shaft for supporting the moving electrode in the welder.

Another object is to provide an electrode shaft for a magnetic force welder of increased strength and reduced resistance to longitudinal motion of the shaft.

Another object is to provide a magnetic force welder which is electrically controlled in all of its functions.

Another object of the present invention is to provide a movable electrode arrangement which is not affected by electrode skid.

These objects are accomplished by securing an electrode to a tubular spindle mounted for reciprocation between a pair of longitudinally spaced linear ball bearings. A pair of direct current coils are mounted in spaced relation adjacent to an armature rigidly secured to the spindle. The electrode on the spindle is closed with a stationary electrode by energizing one of the coils from a direct current bridge rectifier to attract the armature toward the stationary electrode due to the magnetic field set up in the coil. The force exerted on the armature will be substantially constant throughout the welding operation. Energizing of the other coil will shift the magnetic field to the other coil, causing the armature to move the spindle away from the workpiece. A dashpot cup is provided at the end of the spindle to cushion the motion of the spindle in either direction. A supplementary coil is mounted to surround the armature when the electrodes are closed to increase the force of the magnetic field acting on the armature when the spindle has moved the electrode into position to engage the workpiece and welding current has been initiated across the electrodes.

The direct current coils are electrically controlled independently of the electrodes to provide a constant pressure of a predetermined amplitude on the parts being welded in accordance with the requirements of the particular welding operation. The distance between the poles of the magnetic field set up in the frame by the coils is determined by the position of the armature and can be set to provide an increasing pressure on the electrodes during follow-up motion of the armature and spindle to compensate for any increase in the area of the weld as the workpiece collapses. The control circuit for the application of welding current can also be set to provide a conventional resistance welding current, a high amplitude short duration pulse current or a multiple number of current pulses at the electrodes.

Other objects and advantages will be pointed out in, or be apparent from, the specification and claims, as will obvious modifications of the single embodiment shown in the drawings, in which:

FIG. 4 shows the circuit diagram for the welder.

Figure 1:
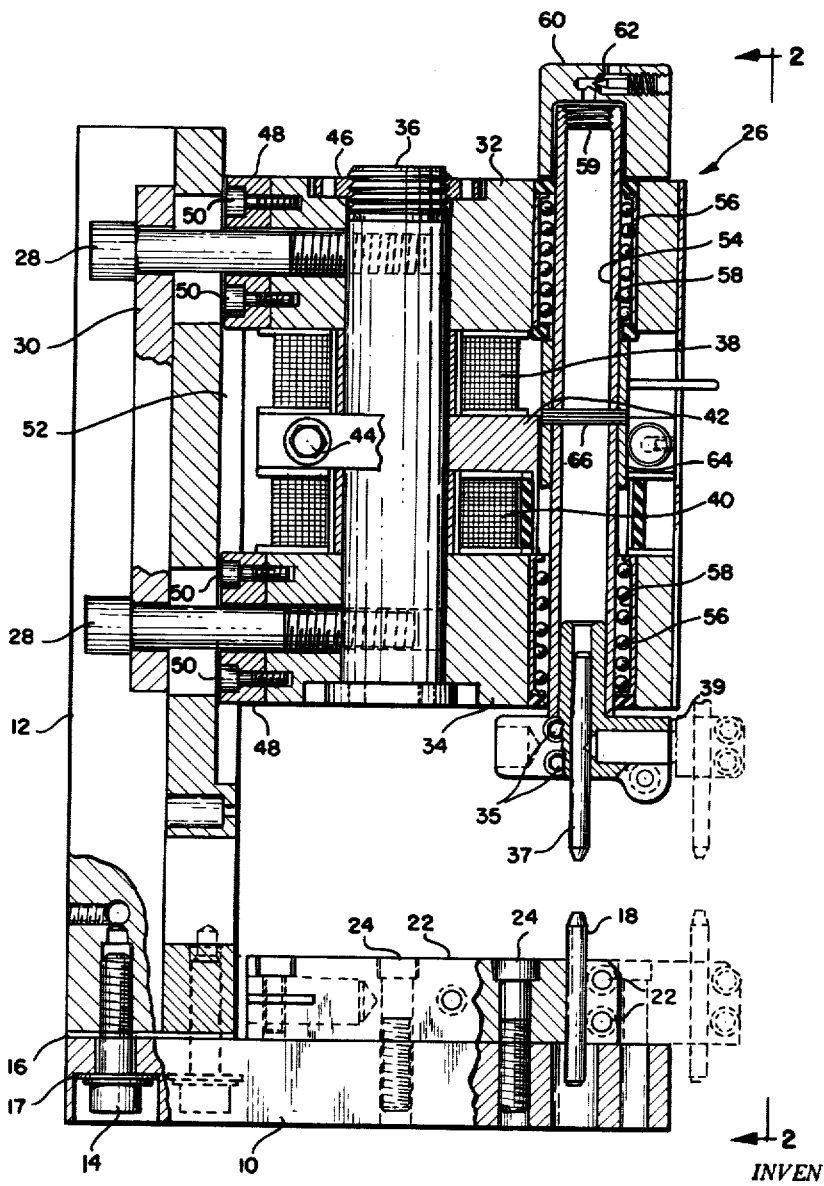
FIG. 1 is a side view partly in section showing the electrodes in an inoperative position.
Figure 3:
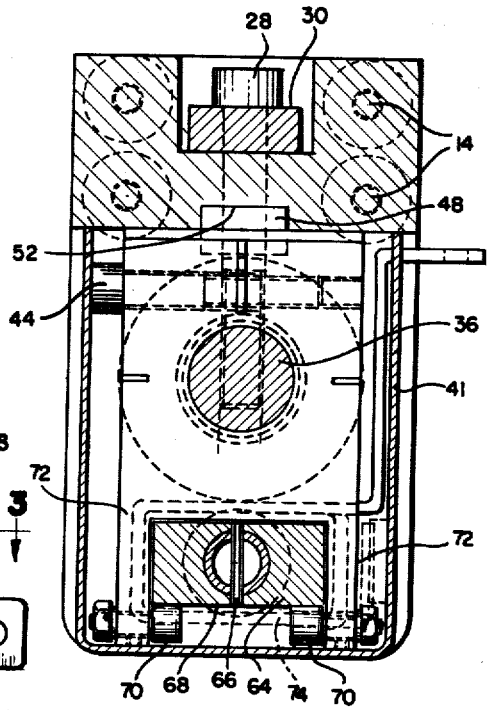
FIG. 3 is taken on line 3—3 of FIG. 2 showing the armature guide.
Figure 2:
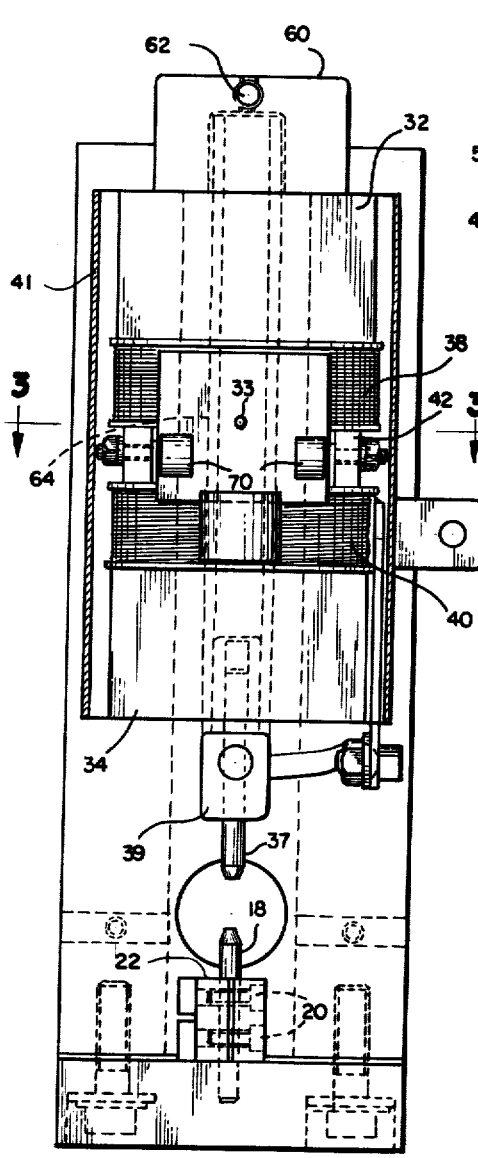
FIG. 2 is a front view of the welder with the cover removed.

Referring to the drawings now in detail, the welder includes a base plate 10 having a vertical mounting plate 12 secured to the base plate by screws 14. An electrically nonconductive insulation 16 and 17 is used to separate the mounting plate from the base plate. A fixed electrode 18 is clamped by screws 20 in an electrode holder 22 which is rigidly secured to the base plate by screws 24. A movable electrode assembly 26 is clamped to the vertical mounting plate by cap screws 28 projecting through a tie bar 30 on the back of the mounting plate.

The movable electrode assembly includes an upper cap 32 and a lower cap 34 mounted on a lock-in shaft 36. A lift coil 38 and a pressure coil 40 are mounted on the lock-in shaft between the caps and are separated by an armature guide 42 clamped on the shaft by screw 44. The end caps, coils and guide are rigidly clamped on the shaft by nut 46. The axial alignment of the end caps is maintained by keys 48 secured to the caps by screws 50 and are vertically movable in groove 52 in the mounting plate.

A tubular non-magnetic spindle 54 is vertically movable in linear ball bearings 56 mounted in holes 58 in the end caps. An electrode holder 39 is inserted into the lower end of the spindle and has an upper welding electrode 37 secured therein by bolts 35. The upper end of the spindle is closed by a cap 59 and projects into an air cushion housing 60 sealed to the upper cap. A needle valve 62 is used to control the flow of air into and out of the air cushion housing to provide a dashpot action when the spindle is moved up or down in the bearings. A cover panel 41 is normally provided to enclose the upper and lower caps and the spindle.

An armature 64 is rigidly secured to the spindle by pin 66 and is movable between the upper and lower caps to raise or lower the upper electrode. The armature is rectangular in shape and has a smooth flat surface 68 on its outer face. Rollers 70 are mounted on the arms 72 of the armature guide to engage the outer edges of the flat surface of the armature and prevent rotary motion of the spindle with respect to the frame and at the same time offers no resistance to longitudinal movement of the electrode shaft. This is essential since any misalignment of the electrodes while under pressure will create turning moments in the spindle, producing "electrode skid." When small parts are to be welded, it is desirable to have the electrodes mounted in front of the axis of the spindle (shown dotted in FIG. 1) where this tendency is much greater due to the addition of a moment arm between the electrodes and the axis of the spindle. Bending forces which are created in the spindle due to any misalignment of the electrodes or due to the position of the electrodes in front of the spindle are resisted by the longitudinal displacement of the linear ball bearings along the axis of the spindle and the relatively large diameter of the spindle. These two features combine to provide a very rigid structure even when the electrodes are not axially aligned with the axis of the spindle.

A supplemental force coil 74 is positioned in the frame between the armature guide and lower end cap and surrounds the periphery of the armature when the spindle is moved downward. The supplemental coil is energized simultaneously with the energizing of the electrodes to increase the strength of the magnetic field during a welding operation. This increase in magnetic field strength is used to provide a substantial increase in force on the electrodes after the welding current has been applied to produce a forging pressure on the workpiece if desired.

Referring to FIG. 4 the wiring diagram for the welder shows a sequence control 76, a weld timer 80 and a heat control 82 all connected across the line $L_1$, $L_2$. The sequence control includes a transformer 84 having its secondary winding connected to terminals 85 and 87 of a selenium bridge rectifier 86 for supplying direct current through resistor 89 and capacitor 91 to the lift coil 38 and the pressure coil 40. A normally closed switch 88 is provided in the lift coil circuit to energize the lift coil while in a standby condition. On energization of the lift coil, a magnetic field will be set up in the upper cap, lock-in shaft and armature guide. The armature will have a tendency to close the gap between the upper cap and the armature guide, moving the spindle and electrode upward. Variable resistor 83 is used to control the current through the lift coil to hold the spindle in the inoperative position and to prevent the possibility of overheating.

A normally open switch 81 is provided in the pressure coil circuit with a rheostat 79 connected to control the current to the pressure coil and consequently the amount of electrode force. A second normally open switch 77 is provided in a shunt circuit 75 for variable resistor 83 which is actuated simultaneously with switch 81. Switches 77, 81 and 88 are interconnected for manual actuation by a foot switch or the like. Normally, switch 88 is opened prior to closing of switches 77 and 81 to allow the spindle to move downward before the pressure coil is energized. Switches 77 and 81 are then closed to produce current flow in the pressure coil in accordance with the setting of rheostat 79. A magnetic field will now be set up in the lower end cap, lock-in shaft and armature guide. This shift in the magnetic field will now produce a downward tendency in the armature. The distance the lower end of the armature is from the lower end cap will determine the initial force on the electrodes.

Normally, it is desirable to allow the electrode pressure to build up to the desired level before initiating the welding current. This is accomplished by a "squeeze" circuit 73 which is connected in parallel with the pressure coil and includes a relay 71 connected in parallel with a capacitor 69 which is used to control the closing of the relay. The time in which capacitor 69 is charged is determined by a rheostat 67. When the capacitor is charged the relay will close simultaneously, closing normally open switch 78, initiating the operation of the weld timer to control the current flow to the electrodes.

After a weld has been completed, switches 77 and 81 are opened and switch 88 closed to release the magnetic force on the work and return the electrode to the standby position. Since a higher current is required to return the electrode spindle to the standby position than is required to hold the spindle in the standby position, relay 71 includes a normally open switch 65 in a shunt circuit 63 to bypass switch 77 and a normally closed switch 61 in series with the switch 88. When the relay is energized, switch 65 will close and switch 61 will open. After the weld switches 77 and 81 are opened and switch 88 closed, the spindle will remain in the down position since switch 61 is open and no current can flow to the lift coil. Relay 71 will remain closed until capacitor 69 discharges. This delay will allow capacitor 91 to become fully charged through relay switch 65. When the relay opens, switch 65 will open and switch 61 will close. The capacitor 91 will immediately discharge across the lift coil, providing a maximum flow of current through the lift coil, returning the spindle to the inoperative position. Variable resistor 83 will reduce the current in the lift coil circuit to a value sufficient to provide a holding current in the lift coil. The reduction in current will prevent any tendency for the lift coil to overheat if the spindle is held in the inoperative position for an extended period of time.

Electrode current is impressed across the electrodes after the pressure coil has been allowed to build up the desired pressure on the workpiece. The weld timer 80 is energized by the closing of delay relay 71 which simultaneously closes normally open switch 78 in the weld timer circuit. The operation of the weld timer, heat control and contactor 57 are generally known and understood in the art and are therefore only shown schematically. The current flow from the contactor flows through a three-way selector switch 55 which can be turned to engage a conventional welding circuit contact 53, a spike welding circuit contact 51 or a pulse welding circuit contact 49. The current flows from the selector switch to a tap switch 47 and then to the primary coil 45 of a welding transformer. The secondary coil 43 is connected to the welding electrodes 18 and 37. Selector switch 33 is connected in the secondary coil circuit to selectively connect supplementary force coil 31 in series with the secondary coil circuit for the electrodes when a supplementary force is desired momentarily after the application of the welding current. The weld timer is designed to provide ½ to 30 cycles of current to the contactor. With switch 55 closed with contact 53 a conventional resistance welding operation can be performed with the machine. It will be obvious that projection welding operations can be readily performed with this arrangement.

When switch 55 is turned to engage the spike welding circuit contact 51, capacitor 29 will be connected in series with the welding transformer primary and discharge resistor 27 will be in parallel with the primary coil and the capacitor. A continuous pulsing current of variable amplitude and short duration will be applied to the primary coil of the welding transformer which can be used for producing a spike welding operation across the electrodes. The amplitudes of the spike can be varied by phase shifting the tubes of the contactor or by turning the tap switch for the welding transformer to increase or decrease the number of turns in the primary coil. By coordinating the increase of direct current on the pressure coil with the number of spike pulses delivered to the electrodes, the electrode force on the workpiece can be increased linearly. The supplementary coil would normally be by-passed for a spike welding operation, but could be used for a specific purpose if desired.

Turning switch 55 to the pulse welding circuit contact 49 will connect the pulse welding circuit 25 in parallel with the capacitor 29. The pulse welding circuit includes a transformer 23 having its primary winding connected across the line $L_1$, $L_2$ and its secondary winding connected in series with a rectifier 21 and a limiting resistor 19. A number of voltage regulating tubes 31 are connected in parallel with the secondary winding circuit and are controlled by a selector switch 15. It can be seen that the capacitor will be precharged by the rectifier to a value determined by the setting of switch 15. The higher the charge on the capacitor, the smaller the amplitude of current that will be allowed to flow to the primary of the welding transformer. The present circuit is designed to provide a pulse having an amplitude of from 100 to 10,000 amperes for a duration of ½ to 4 milliseconds. By the application of a constant force to the workpiece by the direct current coils prior to the energization of the electrode, very small articles can be welded with very precise results.

In operation, the spindle is normally held in the standby position by the lift coil with switch 88 closed and switches 77 and 81 opened. Current through the lift coil can be increased to raise the spindle or decreased to a value sufficient to hold the spindle against the top of the dashpot cap by resistance 83. The selector switch 55 is turned to the desired welding operation, tap switch 47, weld timer 80 and heat control 82 are then set to the desired positions. Rheostat 79 is turned to the desired weld pressure and the rheostat 67 is turned to set the time delay for the initiation of weld current. The workpiece is placed between the electrodes and switch 88 opened to deenergize the lift coil. Switches 77 and 81 are closed after opening switch 88 or may be delayed in closing until the spindle moves downward due to the force of gravity to bring the electrodes into engagement with the workpiece. Needle valve 62 can be adjusted to retard the downward motion of the spindle, preventing the upper electrode from denting the workpiece.

The distance between the lower face of the armature and the magnetic pole in the lower end cap will be determined by the thickness of the workpiece. This distance can be varied by adjusting the electrodes in the electrode holder to provide a desired initial pressure and follow-up pressure. Since the force on the workpiece increases as the distance of the armature from the lower end cap decreases, it becomes important to know this distance to obtain a desired pressure on the workpiece. A pointer 33 is provided on the outer face of the armature to indicate the gap between the armature and the lower end cap. The adjustment of the rheostat will provide a constant flow of current through the pressure coil, thus providing a constant force on the electrodes. The rheostat may be replaced by a transistor circuit to provide a faster control of the direct coil current. Energizing of the pressure coil will also charge capacitor 69 and close relay 71 a short time later. The charging time of the capacitor is determined by the setting of rheostat 67, thereby allowing the electrodes to "squeeze" the workpiece momentarily before initiating the operation of the weld timer. Closing of the relay closes normally open switch 78, starting the operation of the weld timer and the flow of current across the electrodes in accordance with the type of operation selected by switch 55.

Where a projection type welding operation is being performed by the machine, the magnetic gap between the armature and lower end cap is of particular importance. The flow of current across the electrodes will increase the temperature of the workpiece until the metal begins to melt. The workpiece will collapse between the electrodes and the spindle will follow-up instantly, due to the force of the magnetic field on the armature. Friction between the spindle and frame is reduced to a minimum by the linear ball bearings, so that follow-up motion is very fast. This reduces the gap between the armature and the lower end cap, increasing the pressure on the work, even though the current through the pressure coil remains constant. In a projection type weld, the area of engagement between the workpieces increases with the collapse of the metal so that the increase of force on the electrodes due to the closing of the gap between the armature and lower end cap will automatically compensate for this requirement without the necessity of increasing the current through the pressure coil.

The present circuit is readily adjustable to provide a preheating operation on the workpieces by the proper setting of the weld timer. Percussion welding may also be performed in the present system by the proper selection of the current and pressure.

At the completion of the welding operation, switches 77 and 81 are opened and switch 88 closed. A slight time delay will occur before the spindle moves up, due to the discharging of capacitor 69. During this period capacitor 91 will be fully charged and will discharge across the lift coil when the relay opens, as described above, producing maximum current flow in the lift coil.

Although but a single embodiment of the present invention has been illustrated and described, it will be apparent to those skilled in the art that various changes and modifications may be made therein without departing from the spirit of the invention or from the scope of the appended claims.

I claim:

1. A welding machine comprising, a frame including a stationary electrode, a spindle mounted in the frame for movement toward and away from the stationary electrode, an electrode carrier positioned at one end of the spindle for supporting a movable electrode, electromagnetic means supported by the frame for biasing the spindle toward the stationary electrode with a predetermined pressure to clamp a workpiece therebetween, and means for passing an electrode current through the electrodes after a predetermined pressure has been established on the electrodes, said electromagnetic means including means for exerting a lifting force on the spindle after the welding operation to release the workpiece from between the electrodes.

2. A welding machine according to claim 1 wherein said electromagnetic means includes a pair of magnetic coils longitudinally spaced along the axis of the spindle.

3. A welding machine according to claim 2 including an armature secured to the spindle for movement between the coils.

4. A welding machine according to claim 3 including a guide means secured to the frame in operative engagement with the armature to prevent rotary motion of the spindle.

5. A welding machine according to claim 1 wherein said electromagnetic means includes means for reversing the force on the movable electrode to release the workpiece.

6. A welding machine comprising, a frame, a stationary electrode secured to said frame, a hollow spindle supported for reciprocal motion on said frame, a pair of electromagnetic coils longitudinally spaced on said frame relative to said spindle, an electrode carried by said spindle, electric circuit means for energizing one of said coils with a direct current to hold the movable electrode against a workpiece clamped between the electrodes with a predetermined force, and means for supplying welding current to the electrodes, said electric circuit means including a delay circuit for delaying the application of weld current until the biasing force has been applied to the electrodes for a predetermined period of time.

7. A welding machine according to claim 6 wherein said electric circuit means is connected to the other coil to reverse the motion of the spindle at the end of a welding operation.

8. A welding machine comprising, a frame, a stationary electrode secured to said frame, a pair of magnetic coils supported by said frame, an armature mounted for reciprocal motion in said frame and movable between said coils, an electrode supported by said armature, means for energizing one of the coils with a direct current from an alternating current source to move the armature toward the stationary electrode to clamp a workpiece between the electrodes, and means for setting the armature with respect to the frame to provide an increasing force on the workpiece during the follow-up motion of the welding operation.

9. A welding machine according to claim 8 wherein said frame includes means operatively engaging the armature to prevent any rotary motion of the armature and allows frictionless longitudinal motion of the armature.

10. A welding machine according to claim 9 wherein said energizing means includes means for energizing the other coil to move the electrode away from the stationary electrode.

11. A welding machine according to claim 8 including means for applying a welding current across the electrodes independent of the application of the welding force.

12. An electric circuit for a magnetic force welding machine having spaced electrodes adapted to receive a workpiece between them, one electrode being stationary and the other movable relative thereto in response to the energization of one or the other of a pair of electromagnetic coils comprising, a first means for supplying a continuous flow of direct current to one of the coils to bias the movable electrode against the workpiece, a second means for supplying unidirectional current across the electrodes for a predetermined duration, said first means including a control means for initiating the operation of the second means after the bias on the electrodes has attained a predetermined value, and a source of alternating potential connected to each of said means.

13. An electric circuit according to claim 12 wherein said first means includes a bridge rectifier means for converting the alternating potential from the source to a direct potential at the said one coil to provide a constant and continuous force on the electrodes throughout the weld.

14. An electric circuit according to claim 13 wherein said second means includes electric circuits for effecting one of a number of selectable welding operations on the workpiece including pulse, spike or conventional resistance welding operations.

15. An electric circuit according to claim 14 wherein said control means comprises a capacitor relay delay circuit.

16. A welding machine comprising, a frame, a stationary electrode secured to said frame, a movable electrode mounted in said frame for movement toward and away from said stationary electrode to clamp a workpiece therebetween, means for establishing a magnetic field in said frame, an armature secured to said movable electrode and having one face movable toward one pole of the magnetic field, the force between the electrodes increasing as the distance of said one face from said one pole decreases, said armature being responsive to said magnetic field to apply a predetermined pressure between said electrodes.

17. A welding machine according to claim 16 including means for pre-setting the initial position of the said one face of the armature with respect to one of the magnetic poles set up in the magnetic frame whereby the force between the electrodes increases as the workpiece collapses.

18. A welding machine comprising, a frame, a stationary electrode secured to said frame, a movable electrode mounted in said frame for movement toward and away from said stationary electrode to clamp a workpiece therebetween, means for establishing magnetic fields in said frame, magnetic means secured to said movable electrode, said magnetic means being responsive to one of said magnetic fields to apply a predetermined pressure between said electrodes, said means for establishing magnetic fields in said frame includes a first coil which when energized sets up a magnetic field to establish said welding pressure and a second coil which when energized sets up a second magnetic field in the frame for moving said magnetic means and movable electrode away from the workpiece.

19. A welding machine according to claim 18 including electromagnetic means for increasing the force of the magnetic field for establishing welding pressure through the use of the welding current.

20. An electric circuit for a magnetic force welding machine having spaced electrodes adapted to receive a workpiece therebetween comprising, a welding transformer having primary and secondary windings, said secondary winding being connected to the electrodes, a source of alternating potential, said primary being connected to said source, a control device connected in series with said primary to control the flow of current from said source to said primary, means connected to said control device and said primary to provide a current pulse of predetermined amplitude and duration, said pulse means including a capacitive member connected in series with the control device and the primary windings, and an electric circuit means connected in parallel with the capacitor and including a second transformer having a primary winding connected to the source and a secondary winding connected in parallel with the capacitive member, a rectifier connected in series with the secondary winding of the second transformer, and a number of voltage regulating tubes connected in parallel with the rectifier and secondary winding, and switch means for selectively actuating the voltage regulating tubes to control the precharge on the capactive member.

21. A welding machine comprising, a frame having upper and lower frame members, a stationary electrode secured to said frame, a tubular electrode mounted in said frame for movement toward and away from said stationary electrode, an armature secured to said tubular electrode for movement between said frame members, and a third frame member mounted on said frame between said upper and lower frame members and including means for limiting the motion of the armature to axial motion.

22. A welding machine according to claim 21 including a pair of coils mounted on said frame in a predetermined relation to said frame members, means for energizing one of said coils to produce a magnetic field in one of the frame members to move the armature toward the frame member thereby clamping a workpiece between the electrodes, and for energizing the other coil to produce a second magnetic field in the other frame member to move the armature toward the other frame member, said third frame member forming a common magnetic path for both magnetic fields.

23. A welding machine according to claim 22 including a third coil mounted on said frame to increase the magnetic force produced in the said one frame member when welding current is applied to the electrodes.

24. A welding machine according to claim 21 including dashpot means for cushioning the motion of the hollow electrode both toward and away from said stationary electrode.

25. A welding machine according to claim 1 wherein said electromagnetic means includes means for automatically reducing the electromagnetic lifting force of the spindle after the spindle has been moved completely away from the workpiece.

26. An electric circuit for a magnetic welder according to claim 20 including shunt circuit means for bypassing the capacitive member to provide a conventional welding current across the electrodes and switch means for selectively bypassing the capacitive member.

27. An electric circuit according to claim 26 including a resistance member connected in parallel with the capacitive member and the primary winding of the welding transformer to provide a spike welding current across the electrodes, said switch means being adapted to be selectively engagable with either the capacitive member, the shunt circuit or the resistance circuit.

28. An electric circuit according to claim 20 including electromagnetic means for providing a welding force between the electrodes independent of the application of welding current to the electrodes.

References Cited in the file of this patent

UNITED STATES PATENTS

| | | |
|---|---|---|
| 1,327,792 | Thornton | Jan. 13, 1920 |
| 1,976,552 | Friesen | Oct. 9, 1934 |
| 2,256,209 | Levoy | Sept. 16, 1941 |

UNITED STATES PATENT OFFICE
CERTIFICATE OF CORRECTION

Patent No. 3,100,831                         August 13, 1963

William M. Wakeley

It is hereby certified that error appears in the above numbered patent requiring correction and that the said Letters Patent should read as corrected below.

Column 8, line 10, for "windings" read -- winding --; line 51, for "of" read -- on --.

Signed and sealed this 11th day of February 1964.

(SEAL)
Attest:

ERNEST W. SWIDER                      EDWIN L. REYNOLDS
Attesting Officer                     Acting Commissioner of Patents